US008542590B2

(12) United States Patent
Lopez et al.

(10) Patent No.: US 8,542,590 B2
(45) Date of Patent: Sep. 24, 2013

(54) BI-DIRECTIONAL LOAD BALANCING (75) Inventors: Javier M. Lopez, Alameda, CA (US); Imtiaz Shaikh, Irving, TX (US); Phillip A. Ritter, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 269 days.

(21) Appl. No.: 12/956,982

(22) Filed: Nov. 30, 2010

(65) Prior Publication Data

US 2012/0134268 A1 May 31, 2012

(51) Int. Cl.
*H04L 12/26* (2006.01)
(52) U.S. Cl.
USPC ............... 370/232; 370/253; 370/395.2
(58) Field of Classification Search
USPC ............ 370/230, 232, 233, 234, 252, 235, 370/395.2, 450, 453, 468, 395.21, 449
See application file for complete search history.

(56) References Cited

U.S. PATENT DOCUMENTS

| 5,062,055 | A | * | 10/1991 | Chinnaswamy et al. | 702/182 |
| 5,938,732 | A | * | 8/1999 | Lim et al. | 709/229 |
| 7,257,409 | B2 | * | 8/2007 | Chan et al. | 455/453 |
| 8,056,082 | B2 | * | 11/2011 | Koretz et al. | 718/104 |
| 2009/0234956 | A1 | * | 9/2009 | Wang et al. | 709/228 |
| 2010/0050182 | A1 | * | 2/2010 | Mintz et al. | 718/105 |
| 2010/0214943 | A1 | * | 8/2010 | Immendorf et al. | 370/252 |
| 2011/0078318 | A1 | * | 3/2011 | Desai et al. | 709/228 |
| 2012/0087240 | A1 | * | 4/2012 | Karunakaran et al. | 370/230 |

OTHER PUBLICATIONS

ETSI, LTE; Evolved Universal Terrestrial Radio Access Network (E-UTRAN); S1 layer 1 general aspects and principles (3GPP TS 36.410 version 8.1.0 Release 8), ETSI TS 136 410 V8.1.0, pp. 7-8 (2009).*

* cited by examiner

*Primary Examiner* — Ian N Moore
*Assistant Examiner* — Eric P Smith (57) ABSTRACT A method may include receiving, from a user device, a request to access a long term evolution (LTE) network; sending, to one or more servers of a group of servers, a query to obtain information associated with a respective traffic condition and processing capacity; identifying a particular server via which to establish a communication session with the user device based on a determination that the particular server has a reserve processing capacity that is greater than a respective reserve processing capacity associated with other ones of the servers, where the reserve processing capacity is based on a traffic condition and processing capacity associated with the particular server; and sending, to the particular server, an instruction to establish the communication session, where sending the instruction enables the particular server to establish the communication session via which the user device is to access the network.

19 Claims, 6 Drawing Sheets

| MME ID 405 | MAXIMUM CAPACITY 410 | EQUIPPED CAPACITY 415 | LOADING STATE 420 | RESERVE CAPACITY 425 | LAST UPDATE 430 |
|---|---|---|---|---|---|
| MME-1 | M1 | E1 | L1 | R1 | T1 |
| MME-2 | M2 | E2 | L2 | R2 | T2 |
| MME-3 | M3 | E3 | L3 | R3 | T3 |

BI-DIRECTIONAL LOAD BALANCING

BACKGROUND

Evolved Packet System (EPS) is the core network architecture of the third generation partnership project (3GPP) long term evolution (LTE) wireless communication standard. During a communication session between a user device and an LTE network, the user device interfaces with an evolved packet core (EPC), that is one of the main components of the EPS. The EPC is capable of processing various types of traffic (e.g., video, voice, text, etc.) at higher throughput and/or bandwidth than previous generation architectures (e.g., pre-3GPP networks). The various types of traffic are often associated with high bandwidth and/or data rates, which are often generated by high bandwidth applications (e.g., social networking, cloud computing, email, gaming, etc.) used by the user devices. Additionally, as more and more user devices communicate, via the LTE network, the EPC may establish an increasing quantity of high bandwidth communication sessions in order to process the traffic sent to or received from the user devices. While processing the high bandwidth traffic associated with the communication sessions, utilization of bandwidth and/or processing resources, within the LTE network, can become imbalanced (e.g., a load imbalance) between various devices within the EPC. The load imbalance may result in congestion in all or a portion of the LTE network, which can disrupt services provided by the LTE network and/or reduce a quality of service (QoS) associated with the traffic being transported over the LTE network.

DETAILED DESCRIPTION

The following detailed description refers to the accompanying drawings. The same reference numbers in different drawings may identify the same or similar elements. Also, the following detailed description does not limit the invention.

Systems and/or methods, described herein, may enable a load balancing operation to be performed, within a long term evolution (LTE) network, by identifying via which mobility management entity (MME) server traffic is to be processed based on a determination that the identified MME server has sufficient reserve capacity to handle the traffic. As described herein, a load balancing application, hosted by an eNodeB device, may determine a respective quantity of reserve capacity (e.g., reserve processing capacity, bandwidth capacity, throughput capacity, data call capacity, etc.) associated with a group of MME servers within the LTE network. The load balancing application may determine the quantity of reserve capacity based on a difference between a processing capacity and/or traffic conditions associated with the group of MME servers. The load balancing application may determine via which MME server to route the traffic based on a determination regarding which of the group of MME servers has a greatest reserve capacity, and/or a sufficient reserve capacity (e.g., based on a threshold), to process the traffic. Performing the load balancing operation may enable the processing and/or bandwidth resources, associated with the LTE network, to be utilized in a manner that reduces a likelihood and/or risk of congestion within all or a portion of the LTE network.

Figure 1:
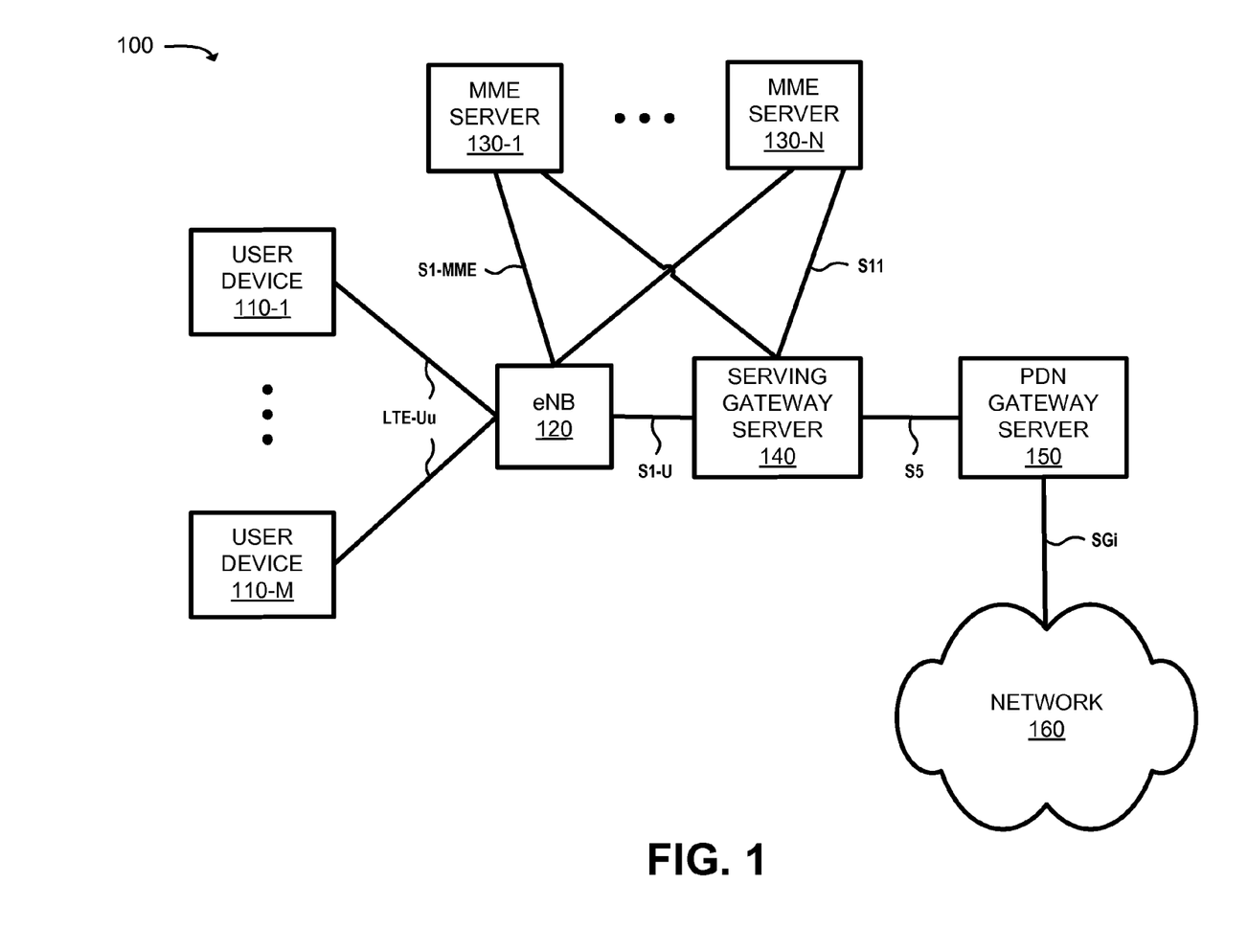
FIG. 1 is a diagram of an example environment in which systems and/or methods described herein may be implemented.

FIG. 1 is a diagram of an example environment 100 in which systems and/or methods described herein may be implemented. As shown, environment 100 may include a group of user devices 110-1, . . . , 110-M (where M≥1) (hereinafter referred to collectively as "UDs 110" and individually as "UD 110"), an eNodeB 120 (hereinafter referred to as "eNB 120"), a group of MME servers 130-1, . . . , 130-N (where N≥1) (hereinafter referred to collectively as "MME 130" and individually as "MME 130"), a serving gateway server 140 (hereinafter referred to as "SGW 140"), a packet data network (PDN) gateway server 150 (hereinafter referred to as "PGW 150") and a network 160. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Also, in some instances, one or more of the components of environment 100 may perform one or more functions described as being performed by another one or more of the components of environment 100.

As further shown in FIG. 1, components of environment 100 may interconnect via a variety of interfaces. For example, UD 110 may interconnect with eNB 120 via an LTE-Uu interface. eNB 120 may interconnect with MME 130 via an S1-MME interface and may interconnect with SGW 140 via an S1-U interface. SGW 140 may interconnect with MME 130 via an S11 interface and may interconnect with PGW 150 via an S5 interface. PGW 150 may interconnect with network 160 via a SGi interface.

UD 110 may include one or more computation and/or communication devices capable of sending/receiving voice and/or data to/from eNB 120. For example, UD 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal gaming system, or another type of mobile computation or communication device.

eNB 120 may include one or more devices that receive traffic being transported via environment 100, such as voice, video, text, and/or other data, to UD 110 via an air interface. eNB 120 may also include one or more devices that receive traffic, from UD 110, via the air interface and/or that transmit the traffic to devices within environment 100, such as MME 130, SGW 140, and/or another device. eNB 120 may control and manage radio network base stations (e.g., that transmit traffic over an air interface to and/or from UDs 110). eNB 120 may perform data processing to manage utilization of radio network services. eNB 120 may act as a controlling radio network controller (CRNC), a drift radio network controller (DRNC), or a serving radio network controller (SRNC). eNB 120 may control the resources of a base station, may serve particular UDs 110, and/or may manage connections towards UDs 110.

In an example implementation, eNB 120 may store logic and/or software associated with a load balancing application that enables eNB 120 to perform a load balancing operation within environment 100. For example, eNB 120 may use the load balancing application to identify via which MME 130 traffic, associated with UD 110, is to be processed based on a respective capacity associated with each MME 130. eNB 120 may send traffic to and/or receive traffic via SGW 140 based on a communication session associated with UD 110.

MME 130 may include one or more computation and/or communication devices that control and manage eNB 120. MME 130 may perform one or more of the following functions: Non-access stratum (NAS) signaling; NAS signaling security; security control; inter-core network signaling for mobility between 3GPP access networks; idle mode UD 110 reachability; tracking area list management (for UDs 110 in idle and active modes); handovers to and/or from environment 100; roaming; traffic policing functions; authentication operations; bearer management functions; etc.

MME 130 may include a maximum processing capacity and/or may be configured with a processing capacity up to the maximum processing capacity. For example, MME 130 may include slots into which line cards (e.g., Gigabit Ethernet line cards and/or some other line cards) and/or other interface cards can be inserted for processing incoming and/or outgoing traffic. A maximum processing capacity may be realized when a line card with a particular processing capacity (e.g., greater than a threshold) is inserted into all of the slots. An equipped capacity may be based on a quantity of the slots into which tine cards have been inserted and/or the processing capacity associated with each of the line cards. MME 130 may send information associated with a maximum and/or equipped processing capacity to eNB 120. Alternatively, or additionally, MME 130 may send, to eNB 120, information associated with a quantity of traffic (e.g., a traffic load, such as a bandwidth, a data rate, processing capacity, a data call rate, etc.) being processed by MME 130 and/or information associated with a reserve capacity (e.g., a difference between an equipped processing capacity and a traffic load) associated with MME 130.

SGW 140 may include one or more server devices, or other types of computation or communication devices, that gather, process, search, store, and/or provide information in a manner similar to that described herein. SGW 140 may establish a communication session with UD 110 based on a request received from MME 130. SGW 140 may, in response to the request, communicate with PGW 150 to obtain an IP address associated with UD 110. Alternatively, or additionally, SGW 140 may establish the communication session with UD 110 by communicating with MME 130, PGW 150 and/or eNB 120 to establish end-to-end bearers associated with a network path that enables traffic to flow to and/or from UD 110 during the communication session. Establishment of the communication session, for example, may enable SGW 140 to receive traffic, from eNB 120, that is destined for network 160 and to send the received traffic to network 160 via PGW 150. In another example. SGW 140 may also receive traffic from PGW 150 and may send the received traffic to UD 110 via eNB 120.

PGW 150 may include one or more server devices, or other types of computation or communication devices, that gather, process, search, store, and/or provide information in a manner similar to that described herein. For example, in one implementation, PGW 150 may include a server device that enables and/or facilitates communications, using IP-based communication protocols, with other networks (e.g., network 160). PGW 150 may allocate IP addresses to UDs 110 that enable UDs 110 to communicate with network 160 based on a request from MME 130 via SGW 140.

Network 160 may include one or more wired and/or wireless networks. For example, network 160 may include a cellular network, a public land mobile network (PLMN), a 2G network, a 3G network, a 4G network, a fifth generation (5G) network, and/or another network. Additionally, or alternatively, network 160 may include a wide area network (WAN), a metropolitan network (MAN), a telephone network (e.g., the Public Switched Telephone Network (PSTN)), an ad hoc network, an intranet, the Internet, a fiber optic-based network (e.g., a FiOS network), and/or a combination of these or other types of networks.

Figure 2:
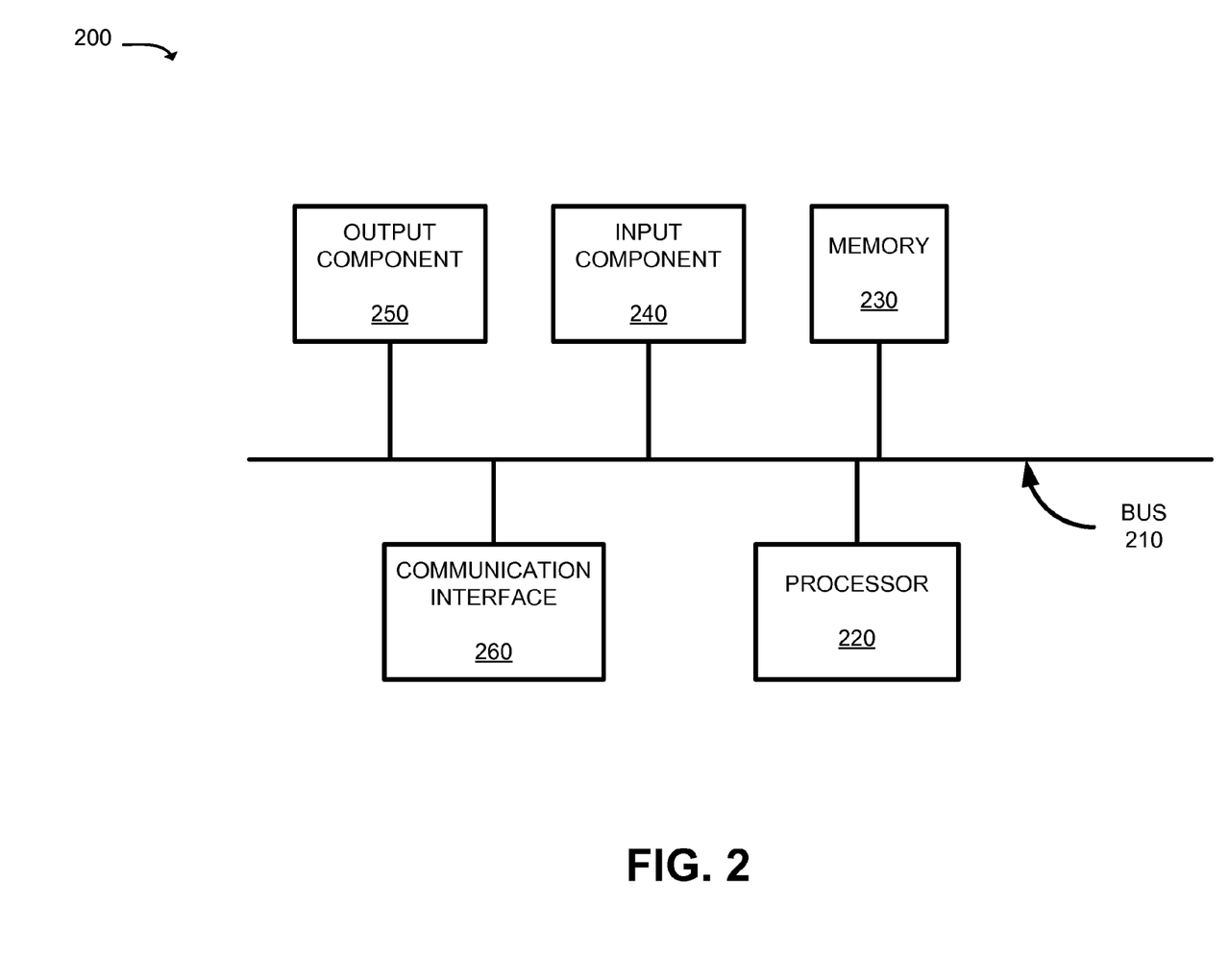
FIG. 2 is a diagram of example components of one or more of the devices of FIG. 1.

FIG. 2 is a diagram of example components of a device 200. Device 200 may correspond to UD 110, MME 130, SGW 140, and/or PGW 150. Alternatively, or additionally, each of UD 110, MME 130, SGW 140, and/or PGW 150 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device, within environment 100, and/or network 160. In one alternative implementation, communication interface 260 may be a logical component that includes input and output ports, input and output systems, and/or other input and output components that facilitate the transmission of data to other devices.

As will be described in detail below, device 200 may perform certain operations relating to bidirectional load balancing. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
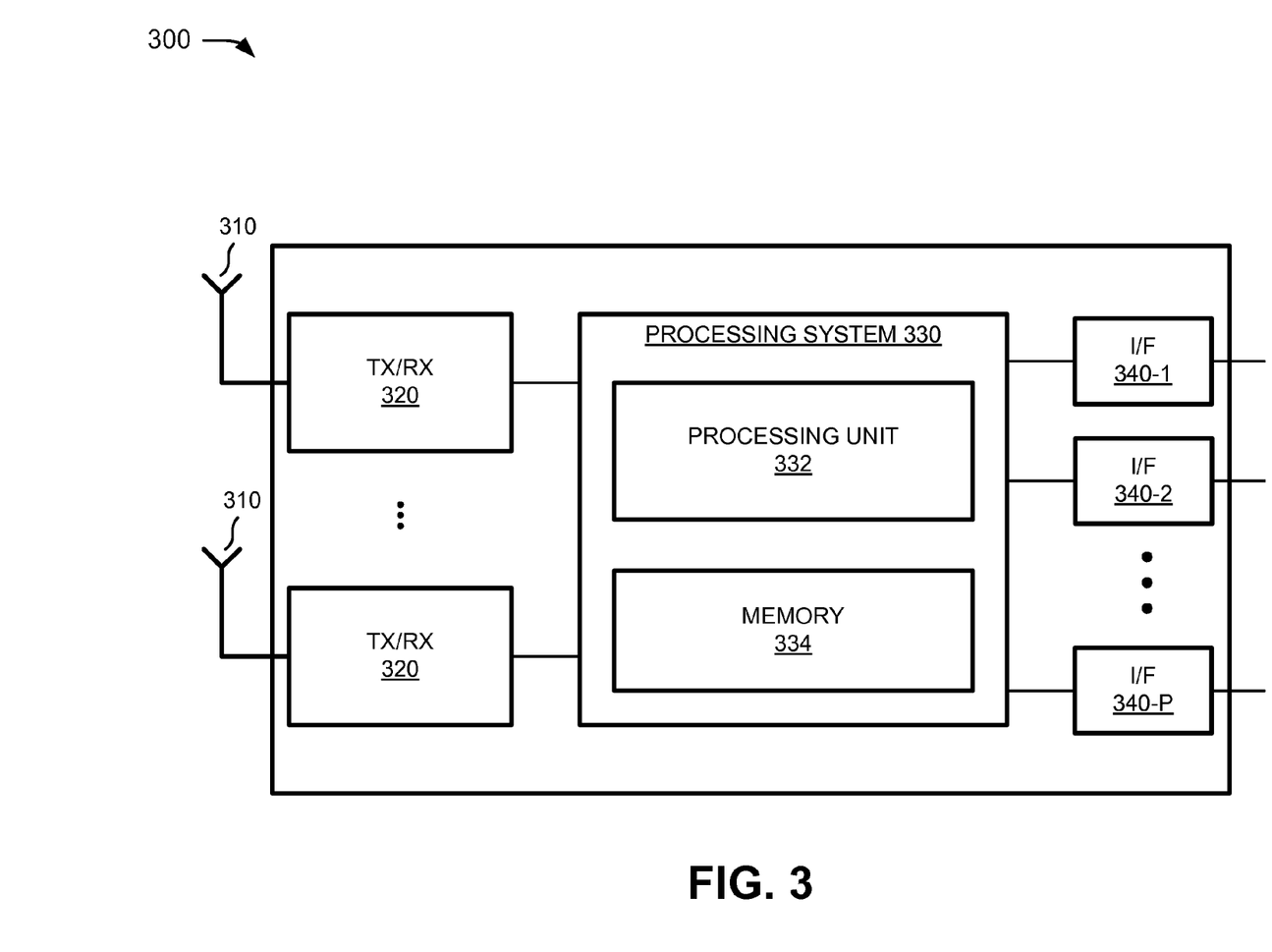
FIG. 3 is a diagram of example components of an eNodeB depicted in FIG. 1.

FIG. 3 is a diagram of example components of device 300 that may correspond to eNB 120. Alternatively, or additionally, eNB 120 may include one or more devices 300. As shown in FIG. 3, device 300 may include antennas 310, transceivers (TX/RX) 320, a processing system 330, and a group of interfaces (I/Fs) 340-1, 340-2, . . . , 340-P (where P≥1) (hereinafter referred to collectively as "I/Fs 340" and individually as "I/F 340"). Although FIG. 3 shows example functional components of device 300, in other embodiments, device 300 may contain fewer functional components, different functional components, differently arranged functional components, or additional functional components than depicted in FIG. 3. Additionally or alternatively, one or more components of device 300 may perform one or more other tasks described as being performed by one or more other components of device 300.

Antennas 310 may include one or more directional and/or omni-directional antennas Transceivers 320 may be associated with antennas 310 and may include transceiver circuitry for transmitting and/or receiving signals via a network, such as environment 100, via antennas 310.

Processing system 330 may control the operation of device 300. Processing system 330 may also process information received via transceivers 320 and I/Fs 340. Processing system 330 may further measure quality and strength of a connection, may determine the distance to UDs 110, and may perform load balancing operations associated with environment 100. As illustrated, processing system 330 may include a processing unit 332 and a memory 334.

Processing unit 332 may include one or more processors, microprocessors, ASICs, FPGAs, or the like. Processing unit 332 may process information received via transceivers 320 and/or I/Fs 340. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 332 may transmit control messages and/or data messages, and may cause those control messages and/or data messages to be transmitted via transceivers 320 and/or I/F 340. Processing unit 332 may also process control messages and/or data messages received from transceivers 320 and/or I/F 340.

Processing unit 332 may host a load balancing application that enables eNB 120 to perform a load balancing operation. For example, processing unit 332 may use the load balancing application to process a load capacity status notification received from one or more MMEs 130 via I/F 340 (e.g., I/F 340 associated with an S1-MME interface). In another example, processing unit 332 may cause device 300 to send a query to MME 130 in order to receive an updated load capacity status notification. The status notification may include information corresponding to a load capacity and/or loading condition associated with one or more MMEs 130. Processing unit 332 may use the information corresponding to the load capacity and/or loading condition, from each of MMEs 130 with which device 300 is interconnected, to identify via which MME 130, traffic associated with UD 110 is to be processed.

Memory 334 may include a RAM, a ROM, and/or another type of memory to store data and instructions that may be used by processing unit 332. For example, processing unit 332 may store, in memory 334, the information corresponding to the load capacity and/or loading condition in a load capacity data structure to be stored. Memory 334 may store information associated with the data structure in response to a write request received from processing unit 332 and/or may retrieve all or a portion of the information associated with the data structure in response to a read request received from processing unit 332.

I/F 340 may include one or more line cards that allow device 300 to transmit data to and/or receive data from devices within environment 100. For example, I/F 340 may correspond to an S1-MME interface via which device 300 communicates with MME 130. In another example, I/F 340 may correspond to an S1-U interface via which device 300 communicates with SGW 140. Device 300 may include another I/F 340 that corresponds to one or more other interfaces via which device 300 communicates with other devices within environment 100.

As described herein, device 300 may perform certain operations in response to processing unit 332 executing software instructions of an application contained in a computer-readable medium, such as memory 334. The software instructions may be read into memory 334 from another computer-readable medium or from another device via antennas 310 and transceivers 320. The software instructions contained in memory 334 may cause processing unit 332 to perform processes described herein. Alternatively, hardwired circuitry may be used in place of or in combination with software instructions to implement processes described herein. Thus, embodiments described herein are not limited to any specific combination of hardware circuitry and software.

Figure 4:
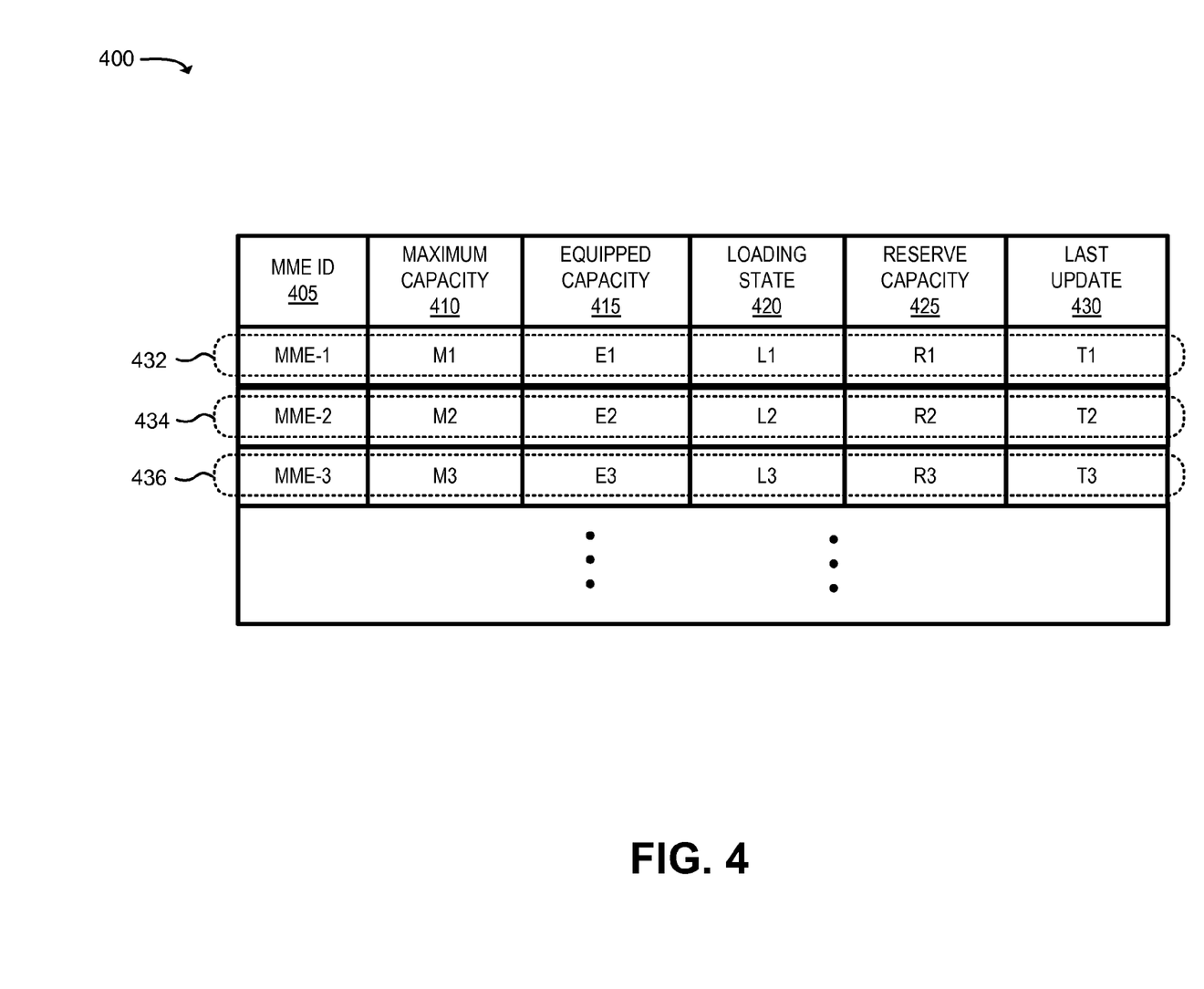
FIG. 4 is a diagram of an example load capacity data structure according to an implementation described herein.

FIG. 4 is a diagram of an example load capacity data structure 400 (hereinafter referred to as "data structure 400") according to an implementation described herein. In one example implementation, one or more data structures 400 may be stored in a storage device that is included as part of memory 334 of eNB 120. In another implementation, one or more data structures 400 may be stored in a memory, associated with another device or a group of devices, separate from or including memory 334 of eNB 120.

As shown in FIG. 4, data structure 400 may include a collection of fields, such as a MME identification (ID) field 405, a maximum capacity field 410, an equipped capacity field 415, a loading state field 420, a reserve capacity field 425, and a last update field 430. Although FIG. 4 shows example fields of data structure 400, in other implementations, data structure 400 may include fewer fields, different fields, additional fields, or differently arranged fields than depicted in FIG. 4. Additionally, or alternatively, one or more fields of data structure 400 may include information described as being included in one or more other fields of data structure 400.

MME ID field 405 may store information (e.g., a device identifier, a network address, etc.) associated with a particular MME 130 with which eNB 120 communicates to receive information associated with a load capacity and/or a loading state.

Maximum capacity field 410 may store a maximum loading capacity associated with the particular MME 130. For example, eNB 120 may receive a status notification from the particular MME 130 that identifies a maximum quantity of loading capacity associated with the particular MME 130. eNB 120 may receive the status notification and may store, in maximum capacity field 410, information associated with the maximum quantity of loading capacity associated with the particular MME 130. The maximum quantity of loading capacity may be a maximum data rate, bandwidth, data call rate, central processing unit (CPU) usage, etc. that the particular MME 130 can process when the particular MME 130 is configured for maximum processing capacity. The status notification may include information, associated with a quantity of slots (e.g., 5 slots, 10 slots, etc.) within which line cards may be inserted to achieve the maximum bandwidth, data rate, data call rate, CPU usage, etc.

Equipped capacity field 415 may store a loading capacity associated with the particular MME 130 based on a manner in which the particular MME 130 is actually configured. For example, eNB 120 may receive a status notification from the particular MME 130 that includes information associated with an equipped loading capacity, which eNB 120 may store in equipped capacity field 415. The information associated with the equipped capacity may be a data rate, bandwidth, data call rate, CPU usage, etc. that the particular MME 130 can actually process based on an actual hardware and/or software configuration associated with the particular MME 130. The status notification may identify, for example, an actual quantity of slots within which line cards have been inserted (e.g., 2 of a maximum of 5 slots; 5 of a maximum of 10 slots, etc.). In another example, the status notification may identify an actual capacity at which the particular MME 130 can process traffic based on the actual hardware and/or software configuration.

Loading state field 420 may store a loading condition associated with the particular MME 130. For example, the status notification may identify an instantaneous loading condition of the particular MME 130, based on an instantaneous bandwidth, data rate, data call rate, etc., that is being processed by the particular MME 130 at a particular point in time. In another example, the status notification may identify an instantaneous quantity of processing usage associated with the particular MME 130. In yet another example, the status notification may identify a loading condition over a period of time (e.g., an average loading condition, etc.), a peak loading condition over the period of time, a minimum loading condition over the period of time, etc.

Reserve capacity field 425 may store a quantity of reserve capacity associated with the particular MME 130. The reserve capacity may, for example, be obtained from the status notification received from the particular MME 130. In another example, eNB 120 may determine the reserve capacity based on a difference between the loading condition and an equipped loading capacity associated with the particular MME 130. Last update field 430 may store a time and/or date associated with the status notification received from the particular MME 130. For example, the time and/or date may correspond to when the status notification was received by eNB 120, when the status notification was sent by the particular MME 130, and/or some other time and/or date.

eNB 120 may receive a status notification from MME 130 and may store information obtained from the status notification in data structure 400. For example, eNB 120 may store an identifier associated with MME 130 (e.g., MME-1), a maximum capacity (e.g., M1), and/or an equipped capacity (e.g., E1) associated with MME 130 (e.g., as shown by ellipse 432). eNB 120 may obtain, from the status notification, a loading state (e.g., L1) and may determine a reserve capacity associated with MME 130 (e.g., R1) based on a difference between the equipped capacity and the loading state (e.g., R1≅E1−L1) (e.g., as shown by ellipse 432). eNB 120 may store a time associated with the status message (e.g., T1, as shown by ellipse 432).

eNB 120 may send a query to another MME 130 to obtain another status notification and may store information obtained from the other status notification in data structure 400. For example, eNB 120 may determine, based on information stored in data structure 400, that an elapsed time and/or date since a previous status notification was received from the other MME 130 (e.g., MME-2 ) is greater than a threshold. Based on the determination that the elapsed time is greater than the threshold, eNB 120 may send a query to the other MME 130 to obtain an updated status notification. eNB 120 may receive the updated status notification (e.g., at time T2) and may store information, obtained from the updated status notification in data structure 400 (e.g., as shown by ellipse 434).

eNB 120 may query one or more MMEs 130 to update a status notification in response to an access request received from a particular UD 110. For example, eNB 120 may receive an access request from the particular UD 110 and may query one or more MMEs 130 (e.g., MME-3 and/or some other MME 130) to obtain a status notification. eNB 120 may receive the updated status notification (e.g., at time T3) and may store information, obtained from the updated status notification in data structure 400 (e.g., as shown by ellipse 436).

Figure 5:
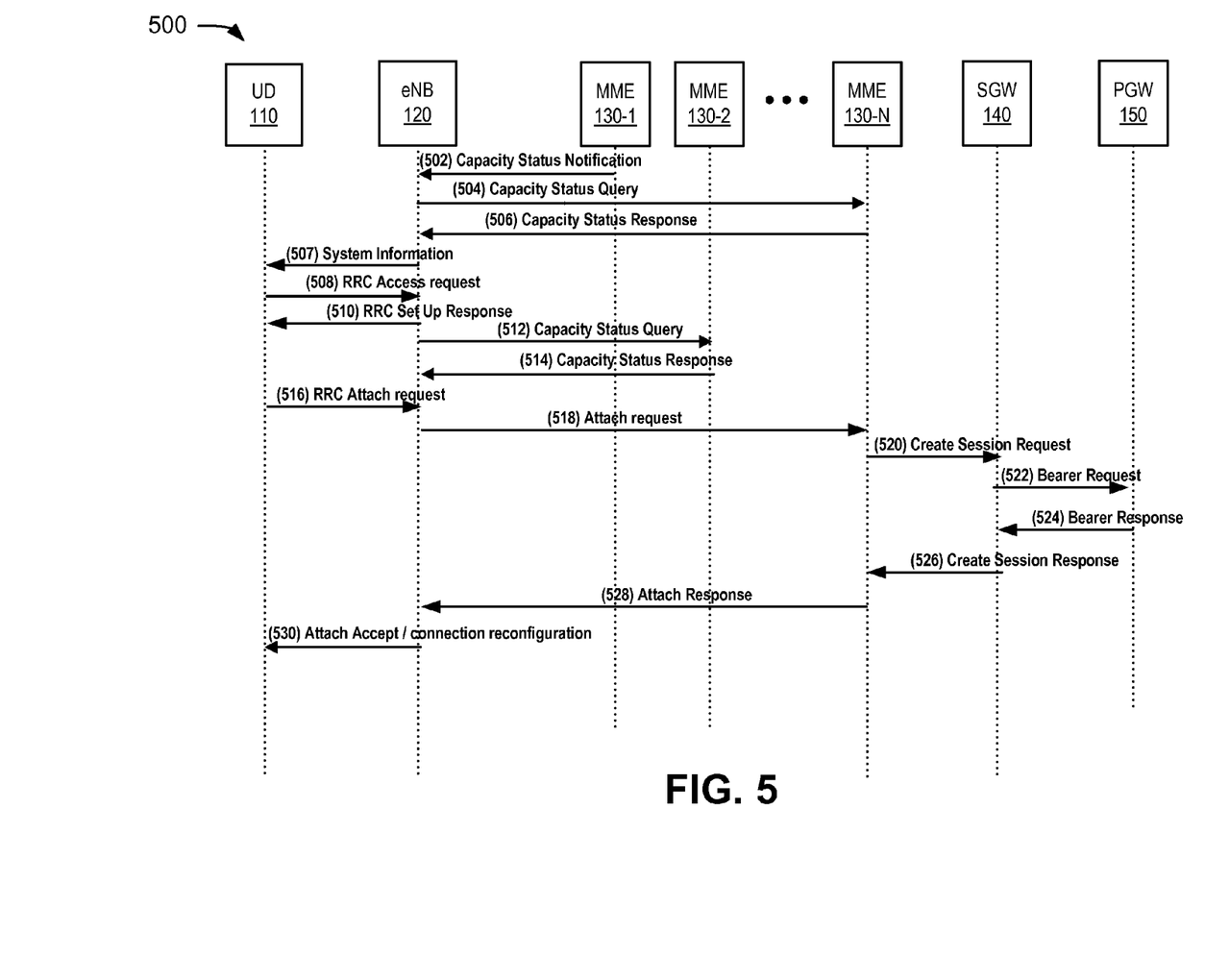
FIG. 5 is a diagram of example interactions among components of an example portion of the environment depicted in FIG. 1 during a load balancing operation.

FIG. 5 is a diagram of example interactions among components of an example portion 500 of environment 100 during a load balancing operation. As illustrated in FIG. 5, example portion 500 may include user device 110, eNB 120, MME 130, SGW 140, and PGW 150. User device 110, eNB 120, MME 130, SGW 140, and PGW 150 may include the features described above in connection with one or more of FIGS. 1-3.

As shown in FIG. 5, MME 130 (e.g., MME 130-1) may send information associated with traffic loading conditions and/or processing capacity associated with MME 130, as capacity status notification 502, to eNB 120. MME 130 may send notification 502 periodically (e.g., every 30 seconds, 5 minutes, 15 minutes, 30 minutes, 1 hour, etc.), at a particular point in time (e.g., at particular time(s) of the day), when traffic loading conditions (e.g., based on a data rate, a bandwidth, a data call rate, a quantity of CPU usage, etc.) are greater than a threshold, and/or when a quantity of reserve capacity is less than a capacity threshold. eNB 120 may receive notification 502 and may store information obtained from notification 502 in a load capacity data structure (e.g., data structure 400 of FIG. 4).

In another example, eNB 120 may send a query to obtain information associated with loading conditions and/or a processing capacity associated with the other MME 130, as capacity status query 504, to another MME 130 (e.g., MME 130-N). The other MME 130 may receive query 504 and may send the information associated with the loading conditions and/or the capacity associated with the other MME 130, as capacity status response 506, to eNB 120. eNB 120 may, in one example, send query 504 when an elapsed time, since a previous capacity status response was received, is greater than an elapsed time threshold. In another example, eNB 120 may send query 504 periodically, at a particular time, and/or upon the occurrence of some event. eNB 120 may receive response 506 and may store information obtained from response 506 in a load capacity data structure (e.g., data structure 400 of FIG. 4).

eNB 120 may broadcast a signal, as system information 507, that includes information associated with environment 100, such as a cell identifier, uplink/downlink frequency information, a time associated with environment 100, and/or other information associated with environment 100. UD 110 may receive system information 507 and may send a radio resource control (RRC) request to access environment 100 and/or network 160, as RRC access request 508, to eNB 120. Request 508 may include information associated with UD 110 (e.g., a device identifier, etc.). eNB 120 may receive request 508 and may send configuration information, as RRC set up response 510, to UD 110. The configuration information may include information associated with a particular channel (e.g., a dedicated control channel (DCCH)) via which future communications are to be performed while UD 110 is being attached to environment 100 and/or network 160.

eNB 120 may, in response to request 508, send a query to obtain information associated with loading conditions and/or a capacity, as capacity status query 512, to a further MME 130 (e.g., MME 130-2). eNB 120 may send query 512 based on a determination that an elapsed time since a previous capacity status response was received from the further MME 130 is greater than the time threshold. The further MME 130 may receive query 512 and may send the information associated with the loading conditions and/or processing capacity associated with the further MME 130, as capacity status response 514, to eNB 120. eNB 120 may receive response 514 and may retrieve a data structure (e.g., data structure 400 of FIG. 4) from a memory associated with eNB 120 and may identify via which MME 130 to establish a communication session associated with UD 110. eNB 120 may base the identification on a determination of which MME 130 has the greatest reserve capacity using information, associated with the loading conditions and/or processing capacity associated with each MME 130, obtained from the data structure and/or response 514. In one example, eNB 120 may rank the reserve processing capacities in descending or ascending order in order to determine the greatest reserve processing capacity. Assume, in this example, that MME 130-N is identified as having the greatest reserve capacity.

UD 110 may receive response 510 and may send a non-access stratum (NAS) attach request, as RRC attach request 516, to eNB 120. eNB 120 may receive request 516 and may establish a logical connection, associated with UD 110 and via an S1-MME interface, with the identified MME 130 (e.g., MME 130-N). eNB 120 may send, via the S1-MME interface, another attach request, as attach request 518, to the identified MME 130. The identified MME 130 may receive request 518 and may send a request to create a session associated with UD 110, as create session request 520, to SGW 140.

SGW 140 may receive request 520, and may create a default bearer for UD 110. SGW 140 may, for example, send a request to establish end-to-end bearer connectivity through environment 100, as bearer request 522, to PGW 150. PGW 150 may receive request 522 and may create the bearer associated with UD 110 (e.g., between SGW 140 and PGW 150 via an S5 interface) and may assign an IP address to UD 110. PGW 150 may send an indication that the bearer was created (e.g., which may include the IP address), as bearer response 524, to SGW 140. SGW 140 may receive response 524 and may send an indication that a communication session with UD 110 has been created, as create session response 526, to the identified MME 130 (e.g., MME 130-N). Response 524 may include the IP address and information corresponding to the bearers associated with an end-to-end network path (e.g., SGW 140, PGW 150, etc.) via which communications with UD 110 will be carried during the communication session.

The identified MME 130 may receive response 526 and may create a bearer between eNB 120 and SGW 140 (e.g., via an S1-U interface), The identified MME 130 may send an indication that the communication session has been created and that end-to-end bearer connectivity, through environment 100 (e.g., via eNB 120, SGW 140, PGW 150, etc.), has been established. The indication may be sent, as attach response 528, to eNB 120. eNB 120 may receive response 528 and may send an indication that a communication session with UD 110 has been created, as attach accept response 530, to UD 110. Response 530 may include configuration information that identifies bearers (e.g., eNB 120, the identified MME 130, SGW 140, PGW 150, etc.) via which UD 110 may communicate during the communication Session. UD 110 may receive response 530 and may use the configuration information to configure UD 110 to communicate with environment 100. eNB 120 may communicate with UD 110 and/or the identified MME 130 to perform other operations (e.g., not shown in FIG. 5), such as set up security protocols, execute authentication protocols, etc. associated with the communication session with UD 110.

Figure 6:
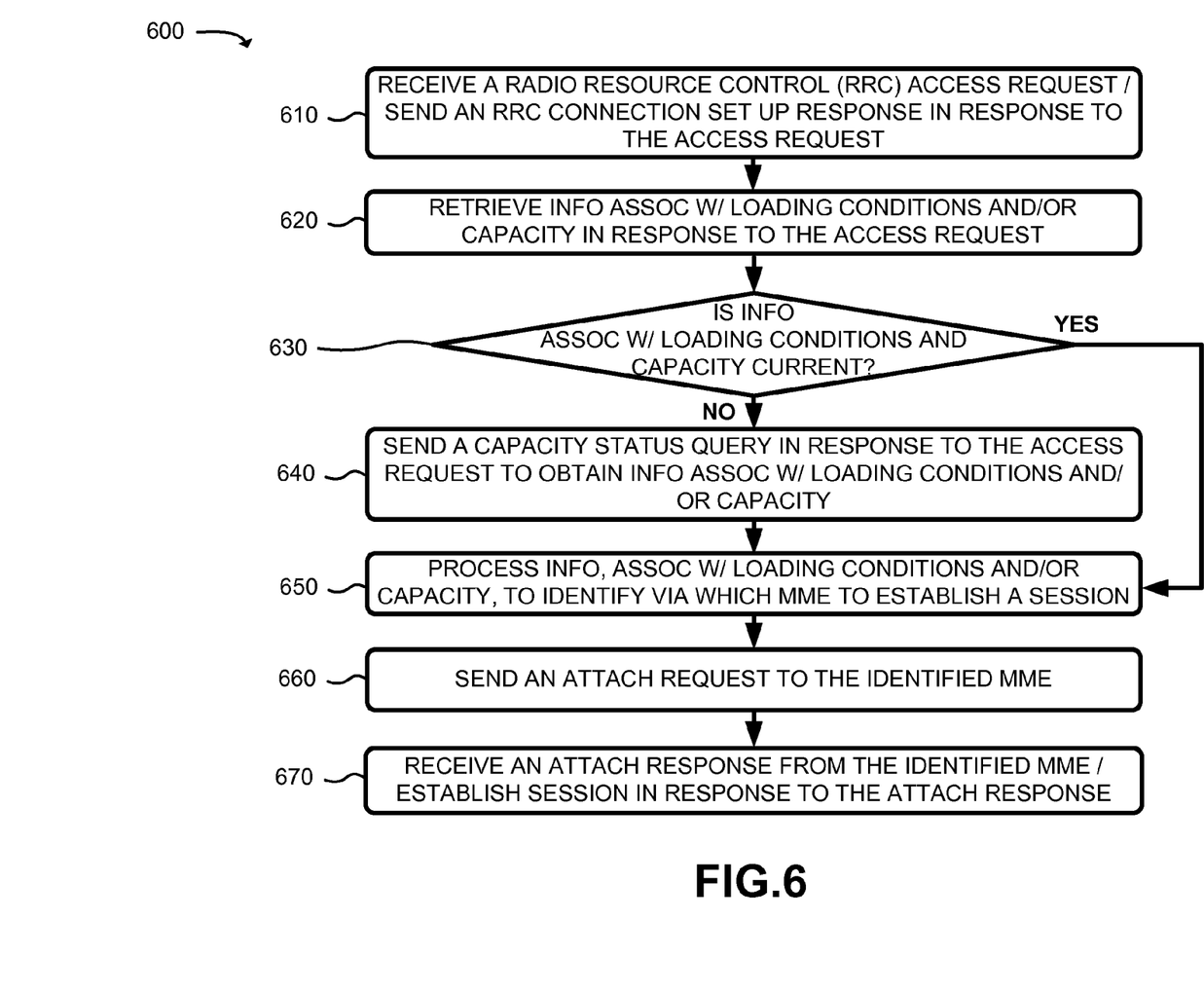
FIG. 6 is a flow chart of an example process for performing a load balancing operation according to an implementation described herein.

FIG. 6 is a flow chart of an example process 600 for performing a load balancing operation according to an implementation described herein. In one example implementation, process 600 may be performed by eNB 120. In another example implementation, some or all of process 600 may be performed by a device or collection of devices separate from, or in combination with eNB 120.

As shown in FIG. 6, process 600 may include receiving an RRC access request and sending an RRC set up response in response to the access request (block 610). For example, eNB 120 may broadcast information (via a broadcast control channel) associated with eNB 120 and/or environment 100 via one or more cells associated with eNB 120. UD 110 may detect the broadcasted information and may send an RRC access request to eNB 120. eNB 120 may, in response to the access request, send an RRC set up response to UD 110.

As also shown in FIG. 6, process 600 may include retrieving information associated with loading conditions and/or capacity in response to the access request (block 620). For example, eNB 120 may, in response to the access request, retrieve information associated with traffic loading conditions and/or capacity, associated with one or more MMEs 130, from a memory associated with eNB 120. The information may, in one example, be stored in a loading capacity data structure (e.g., data structure 400 of FIG. 4). From the information associated with loading conditions and/or capacity, eNB 120 may determine whether the information is current, based on an elapsed time (e.g., corresponding to last update field 430 of FIG. 4) since a previous capacity status notification and/or response was received from each of the MMEs 130 with which eNB 120 communicates.

As further shown in FIG. 6, if information associated with loading conditions and/or capacity is not current (block 630—NO), then process 600 may include sending a capacity status query to obtain current information associated with loading conditions and/or capacity (block 640). For example, eNB 120 may determine that the information associated with the loading conditions and/or capacity corresponding to one or more MMEs 130 is not current based on a determination that the elapsed time is greater than a threshold. eNB 120 may, based on the determination, send a capacity status query to the one or more MMEs 130 with which the information that is not current is associated. The query may be sent to obtain current loading conditions and/or capacity information from the one or more MMEs 130. The one or more MMEs 130 may receive the query and may each send a capacity status response to eNB 120. The capacity status response may be received by eNB 120 and may include information associated with loading conditions (e.g., a bandwidth, a data rate, a quantity of data calls per unit of time, a percentage of CPU capacity being used, etc.) with respect to the one or more MMEs 130. In another example, the capacity status response may include a maximum and/or equipped capacity associated with each of the one or more MMEs 130.

As yet further shown in FIG. 6, if information associated with loading conditions and/or capacity is current (block 630—YES), or after sending the capacity status query to obtain the information associated with the loading conditions and/or capacity (block 640), then process 600 may include processing the information associated with loading conditions and/or capacity to identify via which MME 130 to establish a session (block 650). For example, eNB 120 may determine a reserve capacity associated with each of the MMEs 130 with which eNB 120 communicates. eNB 120 may, for example, base the determination on a difference between traffic loading conditions and an equipped capacity associated with each of the MMEs 130 (e.g., R=E−L, where R is the reserve capacity, E is the equipped capacity, and L is the loading conditions). eNB 120 may identify a particular MME 130 that has a reserve capacity that is greater than a respective reserve capacity associated with other MMEs 130.

In one example implementation, the loading conditions and/or reserve capacity may be an instantaneous value associated with a particular point time (e.g., when each MME 130 measured the loading conditions). In another example implementation, the loading conditions and/or reserved capacity may be determined over a period of time (e.g., an average value with the period of time, a maximum value within the period of time, a minimum value within the period of time, etc.). In yet another example implementation, eNB 120 may obtain information associated with loading conditions and/or capacity from a data structure with respect to a prior period in time. eNB 120 may, for example, use the information obtained from the data structure with respect to the prior period of time to forecast traffic loading and/or reserve capacity trends associated with MMEs 130.

For example, eNB 120 may determine that, for a particular MME 130, instantaneous loading conditions are likely to increase at a future point in time (e.g., which may be associated with a reserve capacity that is likely to decrease accordingly) based on trends identified in the information associated with the prior period of time. Thus, eNB 120 may identify a particular MME 130 with which to establish a communication session based on an instantaneous reserve capacity and/or a forecast regarding whether the instantaneous reserve capacity is likely to increase or decrease at a future point in time. In one example, if MME 130 has a reserve capacity and another MME 130 has another reserve capacity that is approximately equal to the reserve capacity, then eNB 120 may identify the other MME 130 with which to establish the communication session based on a determination that the other reserve capacity is likely to increase at a future point in time while the reserve capacity is likely to decrease at a future point in time.

eNB 120 may send a notification to a network administrator if eNB 120 determines that a particular MME 130 is routinely at or near an equipped capacity. For example, eNB 120 may determine that a reserve capacity associated with the particular MME 130 is less than a threshold. eNB 120 may determine, based on the information obtained from the data structure with respect to the prior period of time, that a quantity of occurrence at which the particular MME 130 is at or near the equipped capacity is greater than another threshold. Based on the determination that the quantity of occurrence at which the particular MME 130 is at or near the equipped capacity is greater than another threshold, eNB 120 may send a notification to a network administrator indicating that the particular MME 130 is routinely at or near an equipped capacity. Additionally, or alternatively, eNB 120 may identify whether the equipped capacity is less than the maximum capacity and may include, within the notification or in a separate notification, a recommendation that the equipped capacity be increased based on a determination that the equipped capacity is less than the maximum capacity.

eNB 120 may determine that a reserve capacity associated with MME 130 is less than the threshold and, based on the determination, may send an instruction to MME 130 to reduce and/or cease bandwidth-consuming communications that are not essential to MME 130 operations and/or operations associated with environment 100. In one example, eNB 120 may send an instruction to MME 130 to reduce and/or cease sending paging messages and/or other non-essential messages to eNB 120 or some other device. eNB 120 may send another instruction, at a later point in time, for MME 130 to resume non-essential communications based on a determination that the reserved capacity is not less that the threshold.

As still further shown in FIG. 6, process 600 may include sending an attach request to the identified MME 130 (block 660). Based on an identified MME 130 with which a session is to be established, eNB 120 may send an attach request to the identified eNB 120 to establish the session. The identified MME 130 may receive the attach request and may communicate with SGW 140 and/or PGW 150 (e.g., via SGW 140) to establish the communication session with UD 110, to create bearers through which UD 110 is to communicate, and/or to obtain an IP address for UD 110 (e.g., in a manner similar to that described in FIG. 5).

As also shown in FIG, 6, process 600 may include receiving an attach response from the identified MME 130 and establish a session in response to the attached response (block 670 For example, eNB 120 may receive an attach response from the identified MME 130 and may send an indication, to UD 110, that a communication session has been established. This indication may include configuration information that identifies via which bearers UD 110 is to communicate during the session (e.g., eNB 120, the identified MME 130, SGW 140, PGW 150, etc.).

Systems and/or methods, described herein, may enable a load balancing operation to be performed, within an LTE network, by identifying via which MME server traffic is to be processed based on a determination that the identified MME server has sufficient reserve capacity to handle the traffic. The systems and/or methods may determine a respective quantity of reserve capacity associated with a group of MME servers within the LTE network. The systems and/or methods may determine the quantity of reserve capacity based on a difference between a processing capacity and/or traffic conditions associated with the group of MME servers. The systems and/or methods may determine via which MME server to route the traffic based on a determination regarding which of the group of MME servers has the greatest reserve capacity, and/or sufficient reserve capacity (e.g., based on a threshold), to process the traffic. The systems and/or methods may enable the processing and/or bandwidth resources, associated with the group of MME servers, to be utilized in a manner that reduces a likelihood and/or risk of congestion within all or a portion of the LTE network.

The foregoing description provides illustration and description, but is not intended to be exhaustive or to limit the implementations to the precise form disclosed. Modifications and variations are possible in light of the above teachings or may be acquired from practice of the embodiments.

While a series of blocks has been described with regard to FIG. 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device associated with a long term evolution (LTE) network, the method comprising:
    receiving, by the device and from a user device, a request to access the network;
    retrieving, responsive to the request, information with respect to a traffic condition and processing capacity, associated with each of a plurality of server devices, stored in a data structure associated with each of the plurality of server devices, wherein the data structure includes:
        information associated with a maximum potential loading capacity, and
        information associated with an as-configured loading capacity, wherein the maximum potential loading capacity and the as-configured loading capacity differ;
    determining, based on a first indicator in the data structure, one or more server devices for which an elapsed time associated with the traffic condition and the processing capacity does not exceed a threshold amount of time;
    determining, based on a second indicator in the data structure, at least one server device for which the elapsed time associated with the traffic condition or the processing capacity exceeds the threshold amount of time;
    sending, by the device and to the at least one server device, a query to obtain information associated with a current traffic condition and processing capacity;
    identifying, by the device and based on the retrieved information and the obtained information, a particular server device, of the plurality of server devices, via which to establish a communication session with the user device based on a determination that the particular server device has a reserve processing capacity that is greater than a respective reserve processing capacity associated with each other of the plurality of server devices,
    wherein the reserve processing capacity is based on the traffic condition and processing capacity associated with the particular server device; and
    sending, by the device and to the particular server device, an instruction to establish the communication session that enables the particular server device to establish the communication session via which the user device is to access the network.

2. The method of claim 1, wherein the query is sent to the at least one server device via one or more S1-mobility management entity (MME) interfaces.

3. The method of claim 1, where identifying the particular server device further includes:
    determining a plurality of reserve processing capacities associated with the plurality of server devices;
    identifying a maximum reserve processing capacity of the plurality of reserve processing capacities; and
    selecting the particular server device to which the maximum reserve processing capacity corresponds.

4. The method of claim 1, wherein identifying the particular server device includes:
    calculating the reserve processing capacity, associated with the particular server device, by subtracting a data rate, associated with traffic being processed by the particular server device, from a particular processing capacity associated with the particular server device, wherein the data rate and the particular processing capacity are derived from the retrieved information and the obtained information.

5. The method of claim 1, further comprising:
    determining, at a later point in time, that another reserve processing capacity, associated with another server device, is equal to the reserve processing capacity associated with the particular server device;
    retrieving, from a memory associated with the device, information associated with a respective traffic condition or processing capacity associated with the each of the plurality of servers from a prior period of time;
    forecasting that the other reserved processing capacity will be greater than the reserve processing capacity, at a future point in time, based on the information associated with the respective traffic condition or processing capacity associated with the each of the plurality of servers from the prior period of time; and
    identifying the other server device via which to establish another communication session based on the forecast that the other reserved processing capacity will be greater than the reserve processing capacity at the future point in time.

6. The method of claim 1, further comprising:
    determining that another reserve processing capacity, associated with another server device, of the plurality of server devices, is less than a threshold; and sending, to the other server device, another instruction to decrease a quantity of communications that are not essential to operations associated with the other server device or the network based on the determination that the other reserve processing capacity, associated with the other server device, is less than the threshold.

7. The method of claim 6, further comprising:
identifying that a quantity of occurrences, in which the other reserve processing capacity is less than the threshold, is greater than another threshold;
identifying that an equipped processing capacity associated with the other server device is less than a maximum processing capacity associated with the other server device; and
displaying, on a display associated with the device, a recommendation that indicates that the equipped processing capacity, associated with the other server device, is to be increased based on the identification that the equipped processing capacity is less than the maximum processing capacity.

8. A device, comprising
a memory to store information associated with traffic conditions and processing capacity associated with a plurality of server devices that are interconnected to the device, wherein the information is stored in a data structure associated with each of the plurality of server devices; and
a processor to:
  receive a request to establish a communication session with a user device,
  retrieve, from the memory responsive to the request, the information associated with the traffic conditions and processing capacity that corresponds to the plurality of server devices,
  determine, based on an indicator in a first stored data structure, one or more server devices for which an elapsed time associated with the traffic condition and the processing capacity does not exceed a threshold amount of time,
  determine, based on an indicator in a second stored data structure, at least one server device for which the elapsed time associated with the traffic condition or the processing capacity exceeds the threshold amount of time, wherein the first and second data structures include:
    information associated with a maximum potential loading capacity, and
    information associated with an equipped loading capacity, wherein the maximum potential loading capacity and the equipped loading capacity differ,
  send, to the at least one server device, a query to obtain information associated with current traffic conditions or processing capacity,
  select a server device, of the plurality of server devices, via which to create the communication session, based on a determination that the selected server device has a greatest reserve processing capacity among the plurality of server devices, wherein the determination is based on the retrieved information and the obtained information associated with the traffic conditions and processing capacity, and
  send, to the selected server device, an instruction to create the communication session based on the selection of the server device, wherein creating the communication session causes traffic, associated with the communication session, to be processed in a manner that avoids congestion in one or more of the plurality of server devices with a reserve processing capacity that is less than the greatest reserve processing capacity.

9. The device of claim 8, further comprising:
an interface unit to:
  receive, from the plurality of server devices and during a prior period of time, the information associated with the traffic conditions and processing capacity, where the information is received via an S1-mobility management entity (MME) interface, where the prior period of time is before the request to establish the communication session is received.

10. The device of claim 9, wherein the processor is further to:
  update the second stored data structure associated with the at least one server device based on the obtained information associated with the current traffic conditions and processing capacity.

11. The device of claim 8, where the processor is further to:
  receive an indication that one or more bearers, via which communications with the user device will be processed, have been established in connection with the communication session, and
  output, to the user device, another indication that the communication session has been established based on the indication that the one or more bearers have been established, where the indication includes information associated with the one or more bearers.

12. The device of claim 11, where the one or more bearers include at least one of:
  a first server device associated with a packet data network (PDN) that assigns an Internet-protocol (IP) address to the user device to be used during the communication session, and
  a second server device that serves the device by establishing a network path between the device and the first server device via which the communications with the user device are to flow during the communication session.

13. The device of claim 8, wherein, when selecting the server device via which to create the communication session, the processor is to:
  determine a respective reserve processing capacity associated with each of the plurality of server devices based on the retrieved information and the obtained information associated with the traffic conditions and processing capacity for the each of the plurality of server devices,
  rank the reserve processing capacities, associated with the plurality of server devices, in a descending or an ascending order,
  identify the greatest reserve processing capacity based on the ranked reserve processing capacities, and
  select the server device that corresponds to the greatest processing capacity.

14. The device of claim 13, where, when determining the respective reserve processing capacity associated with the each of the plurality of server devices, the processor is further to:
  compute a reserve processing capacity for one of the plurality of server devices, by subtracting a bandwidth, associated with traffic being processed by the one of the plurality of server devices, from a particular processing capacity associated with the one of the plurality of server devices.

15. A non-transitory computer-readable medium containing instructions executable by at least one processor, the computer readable medium comprising:

one or more instructions to receive, from a user device, a request to access the network;

one or more instructions to retrieve, from a memory and in response to the request, information associated with a reserve processing capacity indicated in a first data structure associated with a first server device and information associated with a reserve processing capacity indicated in a second data structure associated with a second server device, wherein the first and second data structures include:

information associated with a maximum potential loading capacity, and information associated with an as-configured loading capacity, wherein the maximum potential loading capacity and the as-configured loading capacity differ;

one or more instructions to determine whether to send a query to obtain current information associated with the reserve processing capacity of the first server device or the second server device based on an elapsed time, indicated in the first and second data structures, since the retrieved information was obtained prior to receiving the request;

one or more instructions to send, to the first server device or the second server device, the query to obtain the current information based on a determination that the elapsed time indicated in the first data structure is greater than a threshold amount of time;

one or more instructions to select the first server device, via which to establish a communication session with the user device, based on a determination that the first server device has a reserve processing capacity that is greater than another reserve processing capacity of the second server device; and one or more instructions to send, to the first server device, an instruction to establish the communication session with the user device, wherein establishing the communication session, via the first server device, decreases a risk associated with the second server device from becoming congested when processing traffic associated with the communication session.

16. The non-transitory computer-readable medium of claim 15, where the reserve processing capacity is based on a difference between a loading condition associated with traffic being processed by the first server device and a processing capacity associated with the first server device, and where the loading condition corresponds to at least one of a quantity of bandwidth, a data rate, or a quantity of data calls associated with traffic being processed by the first server device.

17. The non-transitory computer-readable medium of claim 15, further comprising:

one or more instructions to determine, at a later point in time and in response to another request, that the reserve processing capacity, associated with first server device, is equal to the other reserve processing capacity associated with the second server device;

one or more instructions to retrieve, from the memory, information corresponding to a respective loading condition associated with the first server device and the second server device from a prior period of time;

one or more instructions to project that the other reserved processing capacity will be greater than the reserve processing capacity at a future point in time based on the information corresponding to the respective loading condition associated with the first server device and the second server device from the prior period of time; and one or more instructions to identify the second server device via which to establish another communication session based on the projection that the other reserved processing capacity will be greater than the reserve processing capacity at the future point in time.

18. The non-transitory computer-readable medium of claim 15, further comprising:

one or more instructions to determine that the other reserve processing capacity is less than a threshold; and one or more instructions to send, to the second server device, another notification to decrease a quantity of communications that are not essential to operations associated with the second server device or a network associated with the second server device.

19. The non-transitory computer-readable medium of claim 18, further comprising:

one or more instructions to determine, at a later point in time, that the other reserve processing capacity is not less than the threshold; and one or more instructions to send, to the second server device, a further notification that communications that are not essential to operations associated with the second server device or the network associated with the second server device, may be increased.

* * * * *